United States Patent [19]

Gersuk

[11] Patent Number: 5,175,575

[45] Date of Patent: Dec. 29, 1992

[54] SEGMENTED ELLIPSOIDAL PROJECTION SYSTEM

[75] Inventor: Stephen H. Gersuk, Valrico, Fla.

[73] Assignee: Contraves USA-SSI, Tampa, Fla.

[21] Appl. No.: 827,154

[22] Filed: Jan. 28, 1992

[51] Int. Cl.⁵ .............................................. G03B 37/04
[52] U.S. Cl. ....................................... 353/94; 353/30; 359/451; 352/69
[58] Field of Search ............................ 353/94, 30, 11; 359/451, 459, 449, 443; 352/69, 70, 71

[56] References Cited

U.S. PATENT DOCUMENTS

| | | | |
|---|---|---|---|
| 2,280,206 | 4/1942 | Waller et al. | 359/451 |
| 2,953,964 | 9/1960 | Dresser | 353/30 |
| 3,144,806 | 8/1964 | Smith | 352/70 |
| 3,237,517 | 3/1966 | Komitor | 359/451 |
| 3,526,452 | 9/1970 | Dorn | 352/70 |

FOREIGN PATENT DOCUMENTS 0477349 9/1951 Canada ................... 352/70
0766674 1/1957 United Kingdom ................... 352/70

Primary Examiner—William A. Cuchlinski, Jr.
Assistant Examiner—William C. Dowling
Attorney, Agent, or Firm—Ansel M. Schwartz

[57] ABSTRACT

The present invention is a projection system which includes a plurality of screen segments, each defining a surface in the shape of an ellipsoidal segment such that each surface has a first focal point and a second focal point. The screen segments are arranged such that an edge of the surface of one of the screen segments is essentially adjacent along its entire length to an edge of the surface of another screen segment. The projection system also includes a plurality of projectors, equal to the number of screen segments. Each of the projectors projects an image upon one of the screen segments from the second focal point of that screen segment. Preferably, the screen segments are arranged such that the first focal points of their surfaces essentially coincide with each other.

11 Claims, 4 Drawing Sheets

SEGMENTED ELLIPSOIDAL PROJECTION SYSTEM

FIELD OF THE INVENTION

The present invention relates in general to projection screens. More particularly, the present invention is related to a projection system having a screen formed of a plurality of segments each of which has an ellipsoidal surface.

BACKGROUND OF THE INVENTION

It is known in the art to project images from several projectors onto a curved screen with a high-gain surface to construct an all-surrounding life-like image around a central area. Such a curved, high-gain screen is used to achieve higher luminance of the projected scene when viewed from the central area than is achievable using a plurality of flat screens as the projection surface. Typically, these curved screens have a surface of a spherical or toroidal shape and a surface gain greater than unity so that more light is reflected back to the observer than would otherwise be reflected if the screen had a gain of unity or less. By unity gain, it is meant a surface with characteristics similar to, for example, magnesium oxide or flat, very-white paint, that is, a surface that reflects an incident light ray equally in all directions, and the intensity of a reflected ray is equal irrespective of the angle of observation. By high-gain, it is meant a surface which reflects a light ray preferentially at an angle of reflection equal and opposite the angle of incidence. In measurements typical of the art, the intensity of a reflected ray measured on the specular axis (that is, measured at an angle of reflection equal and opposite the angle of incidence), compared to a similar measurement made on a unity gain screen, is referred to as the screen gain. (Actually, for purposes of defining the bulk surface characteristic called gain, the incident ray is directed normal to the surface; relative gain measured at other angles of incidence varies either slightly or substantially, depending on the type of screen material. However, the foregoing definition is sufficiently accurate for the present discussion). By use of such a high-gain screen, it is known in the art to achieve higher image luminance in the viewing area at the expense of lower luminance outside that area, since screen brightness decreases substantially as the angle of measurement departs from the specular axis. The use of multiple projectors, along with multiple sources of video imagery, serves to increase the sharpness of the image thus created, since each video image, of limited resolution, is then spread over a smaller area. Curved screens and a plurality of projectors are currently used extensively to create large life-like images for various types of simulators.

A problem exists with these curved projection screens in that when the observer is displaced from the central viewing point, there occurs abrupt changes of brightness at the boundaries between the screen segments. This is a common occurrence when multiple observers must view the same image, as for example in an air traffic control tower simulator, where multiple controllers view and interact with the scene of the surrounding airfield and its associated air and ground vehicles. The abrupt light change is due to the fact that a ray of light from one projector on one side of the boundary is reflected closer to the observer than a ray of light just on the other side of the boundary from a different projector. While the human eye is very tolerant of even large changes in luminance that occur gradually across a scene (as is commonly the case with light emanating from any set of projection optics), abrupt discontinuities of even small amounts are immediately and annoyingly apparent. The present invention overcomes this problem by providing screen segments having a surface composed of a multiplicity of ellipsoidal shapes, juxtaposed in a particular fashion.

An ellipse, by definition, has two focal points. An ellipsoidal surface is created by the rotation of an ellipse about the axis containing the two focal points. By the mathematical properties of an ellipsoid, light emanating from one focal point of an ellipsoid onto a specular (mirrored) internal surface is reflected entirely back to the other focal point. Similarly, light projected onto a partially-specular (high-gain) ellipsoidal screen from one focal point is preferentially reflected to the other focal point. By, for instance, arranging the ellipsoidal screens such that their first focal points coincide and projecting the images from the screen's second focal point, respectively, a ray of light on one side of the boundary will reflect through the common first focal point and a ray of light on the other side of the boundary will also reflect through the common first focal point. Accordingly, it is impossible to move farther away from a ray of light reflected from one side of the boundary than from the other. Thus, there will be no abrupt change in brightness across the boundary from any viewpoint.

SUMMARY OF THE INVENTION

The present invention is a projection system which includes a plurality of screen segments, each defining a surface in the shape of an ellipsoidal segment such that each surface has a first focal point and a second focal point. The screen segments are arranged such that an edge of the surface of one of the screen segments is essentially adjacent along its entire length to an edge of the surface of another screen segment. The projection system also includes a plurality of projectors, equal to the number of screen segments. The screen segments are arranged such that the first focal points of their surfaces essentially coincide with each other, and each of the projectors projects an image upon one of the screen segments from the second focal point of that screen segment.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
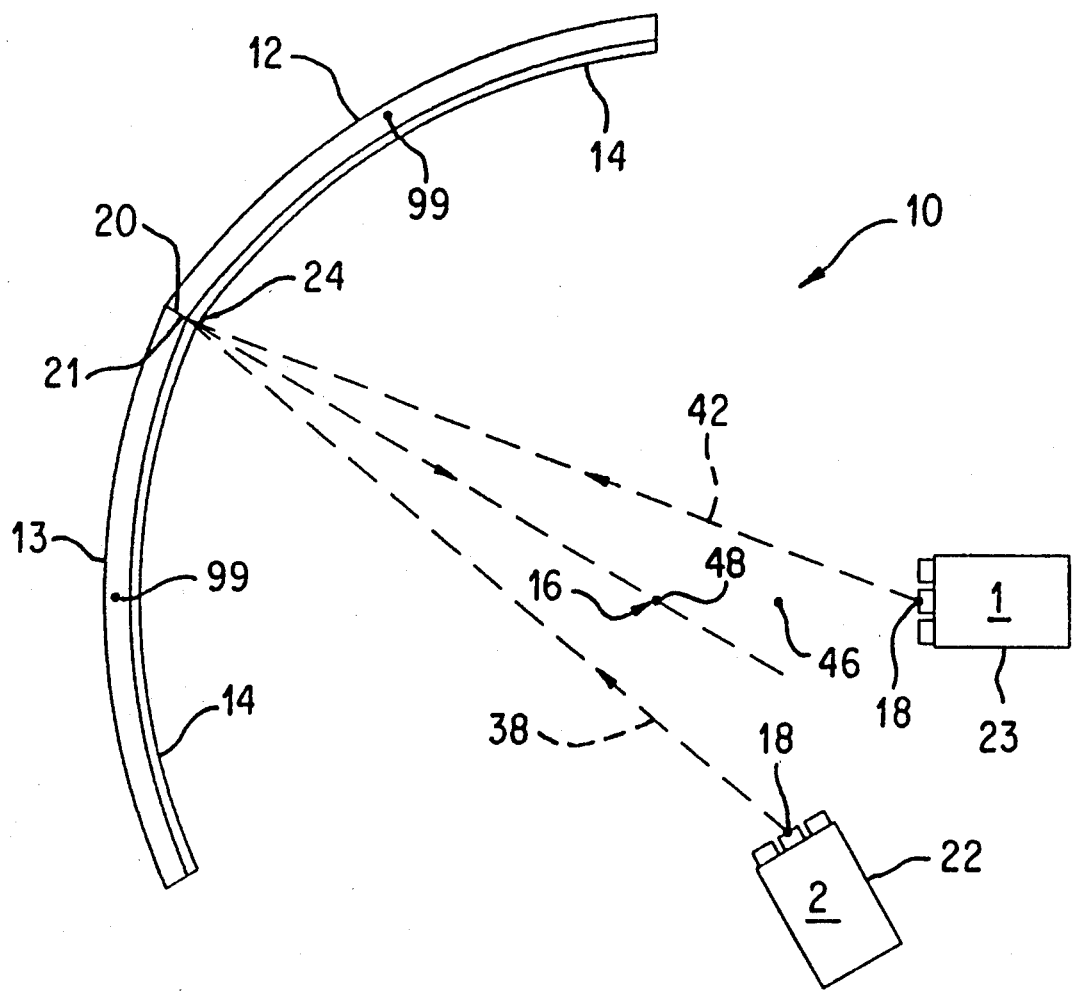
FIG. 1 is a graphical representation showing a plan view of the segmented ellipsoidal projecting system.

Referring now to the drawings wherein like reference numerals refer to similar or identical parts throughout the several views, and more specifically to FIG. 1 thereof, there is shown a projection system 10. The projection system 10 comprises a plurality of screen segments. There are two screen segments 12, 13 shown in figure for simplicity of description. Each screen segment 12, 13 defines a surface 14 having the shape of an ellipsoidal segment (part of the surface area of an ellipsoid) such that each surface 14 has a first focal point 16, a second focal point 18, and a point on the screen surface 99, point 99 being selected to achieve the desired viewing distance from the focal point 16 to the screen. The continuous ellipsoidal surface thus defined is the locus of all points the sum of whose distances to the two focal point points is a constant, to wit, the same as point 99. The surface of each segment is only a portion of the continuous ellipsoidal surface thus defined, being bounded by vertical planes radiating from focal point 16 at regular angular spacings. One such plane divides segments 12 and 13 along their boundary 24. The segment is further bounded top and bottom to achieve the desired vertical field of view although this boundary is not apparent in the figures. The screen segments 12, 13 are arranged such that an edge 20 of the surface 14 of screen segment 12 is essentially adjacent along its entire length to an edge 21 of the surface 14 of screen segment 13. The edges 20, 21 meet to form a boundary 24 between the screen segments 12, 13.

The projection system 10 also includes a plurality of projectors, one for each screen segment. Projector 22 projects an image onto the surface 14 of screen segment 12. Projector 23 projects an image onto the surface 14 of the screen segment 13. It is known in the art to shape the raster of the projectors so as to achieve left and right edges of each projected image that abut one to the other essentially without gaps or overlap, or alternatively to perform video processing in addition to raster shaping such that the images overlap smoothly with blended edges so as to create an essentially undiscernible seam between adjacent images. The projectors 22, 23 project an image upon their respective screen segments 12, 13 from the second focal point 18 of that screen segment 12, 13. Preferably, the first focal point 16 of the screen segments 12, 13 coincide with each other at point 48 or are within close proximity to each other.

Figure 2:
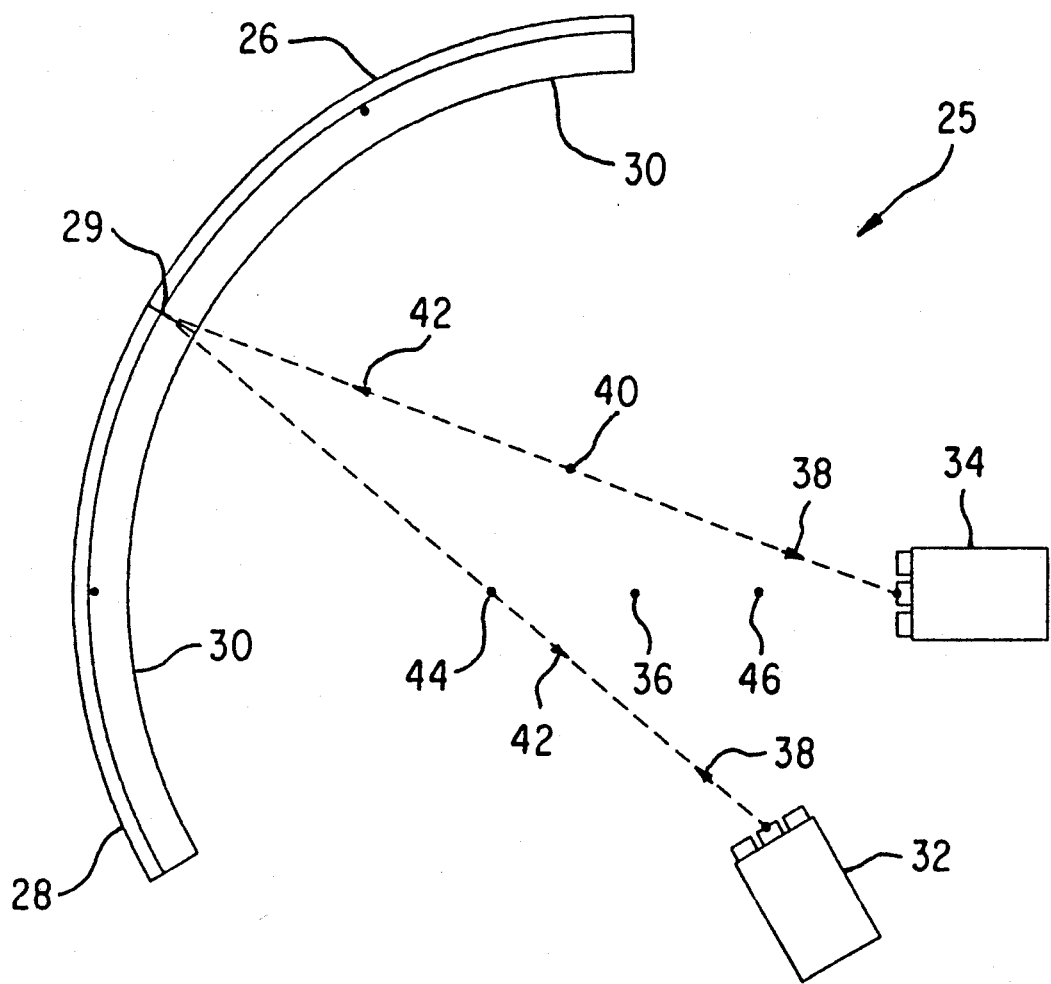
FIG. 2 is a graphical representation showing a plan view of a screen having a toroidal surface.

The following example serves to illustrate the problem of abrupt brightness changes inherent with spherical or toroidal projection screens. Referring to FIG. 2, there is shown a typical spherical or toroidal projection system 25. The toroidal projection system 25 has two screen segments 26, 28 each of which is a portion of a single continuous toroidal surface 30. A toroidal screen as is presently described may be characterized by two parameters, these being the radius of the surface seen in the plan view, commonly called the horizontal radius, and the radius seen in an elevation view, commonly called the vertical radius. The horizontal radius is selected similarly as in the case for the previously described elliptical screen, that is, to achieve a desired viewing distance from center. The size and location of the vertical radius are selected to optimize the image luminance by means known in the art. The segments 26, 28 are adjacent to each other at a boundary 29. Projector 32 projects an image upon the surface 30 of the screen segment 26 while projector 34 projects an image upon the surface 30 of the screen segment 28.

The toroidal screen segments are arranged around a center point 36. Seen in the plan view of FIG. 2, a first light ray 38 projected from projector 32 reflects from the screen segment 26 essentially at boundary 29 and back through the focal point 40 of screen segment 26. The ray actually reflects through the vertical plane containing focal point 40, and would generally pass above or below focal point 40. Similarly, a second light ray 42 projected from projector 34 reflects from the screen segment 28 essentially at boundary 29 and back through the focal point 44 of the screen segment 28. (Because of the geometry of the toroid, the light rays 38, 42 overlap with each other in FIG. 2). An observer (not shown) when viewing the screen segments 26, 28 from the center point 36 and looking at the boundary 29 would be the same distance from the reflected first light ray 38 as from the reflected second light ray 42. Since the light rays 38, 42 are the same distance from the observer at center point 29, their perceived brightness will be equal and there will be no abrupt change of brightness across the boundary 29.

A different situation occurs when the observer is displaced from the center point 36 of the spherical or toroidal viewing area. If the observer moves to the right in FIG. 2, say to point 46, and looks at the boundary 29, the reflected first light ray 38 from projector 32 is now closer to the observer than the reflected second light ray 42 from projector 34. Thus, the reflected first light ray 38 will appear brighter to the observer than the reflected second light ray 42. This phenomenon occurs along the entire height of the screen segments 26, 28 at the boundary 29 and causes the image projected on the surface of the screen segments 26, 28 to have an abrupt change in brightness at the boundary 29.

Referring back to FIG. 1, there is shown the projection system 10 having two screen segments 12, 13 having ellipsoidal surfaces 14 which are adjacent to each other along boundary 24. The first focal point 16 of the screen segments 12, 13 coincide with each other at point 48. Projector 22 projects an image on screen segment 12 while projector 23 projects an image on screen segment 13. A first light ray 38 projected from projector 22 reflects from the surface 14 of screen segment 12 essentially at the boundary 24 and back through the screen segment's 12 focal point which coincides with point 48. A second light ray 42 projected from projector 23 reflects from the surface 14 of screen segment 13 essentially at boundary 24 and back through the screen segment's 13 focal point which also coincides with point 48. Thus, it can be seen from FIG. 1 that the light rays 38 and 42 essentially follow the same path after reflecting from boundary 24 both intersecting their common focal point, point 48. The importance of this is illustrated as one moves the observer to the right of point 48 to right viewpoint 46. An observer at right viewpoint 46 looking at the boundary 24 is the same distance from reflected light ray 38 as from the reflected light ray 42. Thus, to the observer, the light rays 38 and 42 are the same brightness and there exists no abrupt light change across the boundary 24. In fact, the observer can move anywhere in front of the screen segments 12, 13 and still be the same distance from light ray 38 as from light ray 42 since they essentially overlap after reflection from the boundary 24.

An implementation of the invention to achieve a desired field of view, to wit, extending 240° horizontally and from 10° below the horizon to 30° above the horizon, and with a desired number of projectors, to wit, four, and with a desired distance from the center eyepoint to the screen, to wit, 144", is described in the following paragraphs.

Figure 3:
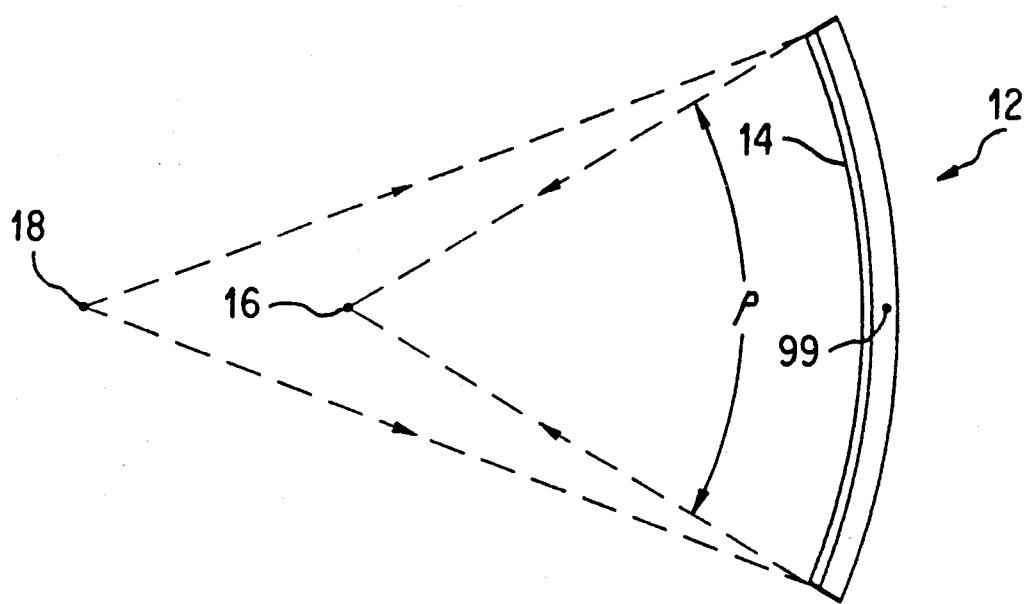
FIG. 3 is a graphical representation showing a plan view of one of the ellipsoidal screen segments and its associated angles.

Referring to FIG. 3, there is shown a plan view of the screen segment 12 having an ellipsoidal-shaped surface 14. The horizontal field of view, defined as $\rho$, is computed as the total horizontal field of view ($\Delta$) divided by the number of projectors, or 240/4=60° as measured from the first focal point 16. Focal point 16 is selected to correspond to the average eye height of the intended observers. A second point 99 is selected, level with focal point 16 and at a distance from focal point 16 chosen from a variety of considerations, including primarily the desired eye relief from the screen and the size of the facility in which the screen is to be installed. A projector (not shown) projects an image upon the surface 14 from the second focal point 18. The location of focal point 18 is selected according to two criteria. First, it is made sufficiently distant from the screen segment by means known in the art so that when the principal point of the projection lens assembly is located at this point, the image from the projector is sufficiently large to cover the entire screen segment. Second, it is located sufficiently high so that the projector does not shadow light rays emanating from another projector onto another screen segment. This latter criterion may be conveniently determined using a scaled elevation drawing of the screen segments, and performing one or more iterations to determine that the mechanical structure of the projector will not cause shadows. The three points thus selected, focal point 16, point 99, and focal point 18, completely define the ellipsoidal surface in the manner previously described. Consequently, the ellipsoid is completely defined by: the center focal point, selected at a convenient eye height; point 99, selected to provide sufficient eye relief (and must be chosen before you can even start to look for point 18); and the second focal point 18 (selected to be sufficiently far from 99 to allow the projector to illuminate the entire screen, and sufficiently high to avoid blocking light from other projectors).

Thus, selection of point 18 is really a simple but iterative process; pick a point, check for screen illumination and shadows, and move it if necessary. Any point 18 that is high enough and distant enough from the screen will work, and will exploit the advantage of the invention (no brightness discontinuities). It is desirable to make point 18 essentially as low as possible and as close to 99 as possible, to obtain the overall brightest, sharpest picture.

Figure 4:
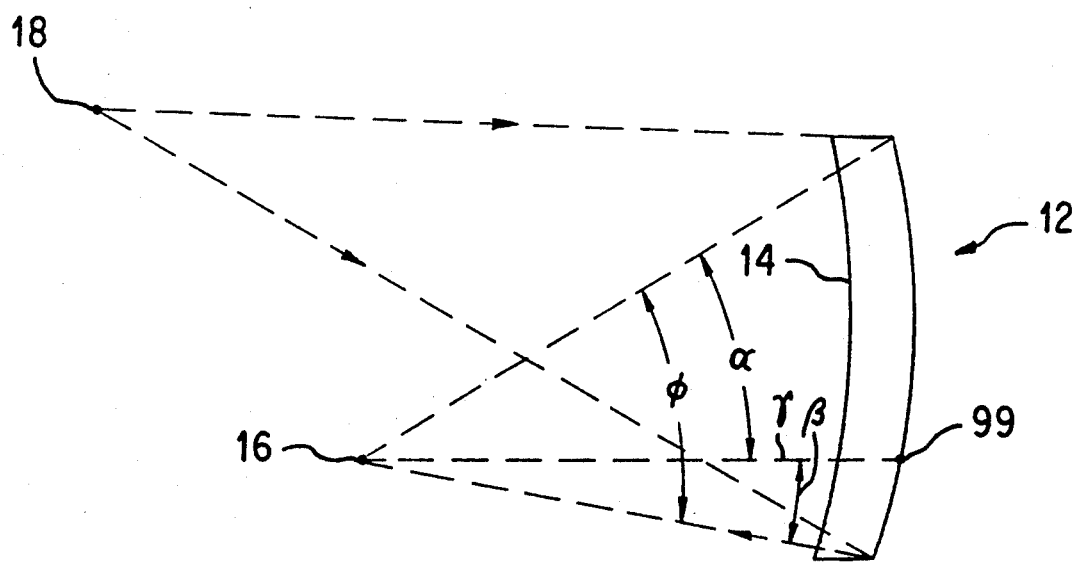
FIG. 4 is a graphical representation showing a side view of one of the screen segments and its associated angles.

Referring to FIG. 4, there is shown a side view of screen segment 12 having an ellipsoidal-shaped surface 14. The projector (not shown) projects an image upon the surface 14 from the second focal point 18. The reflected light rays reflect through the first focal point 16. The vertical field of view, defined as $\phi$, is seen to fulfill the desired vertical field of view extending from 10° below the horizontal ($\beta$) to 30° above the horizontal ($\alpha$) as measured from the first focal point 16. The eye relief defined by line $\gamma$ is 144" when measured horizontally from focal point 16, as was desired.

Figure 5:
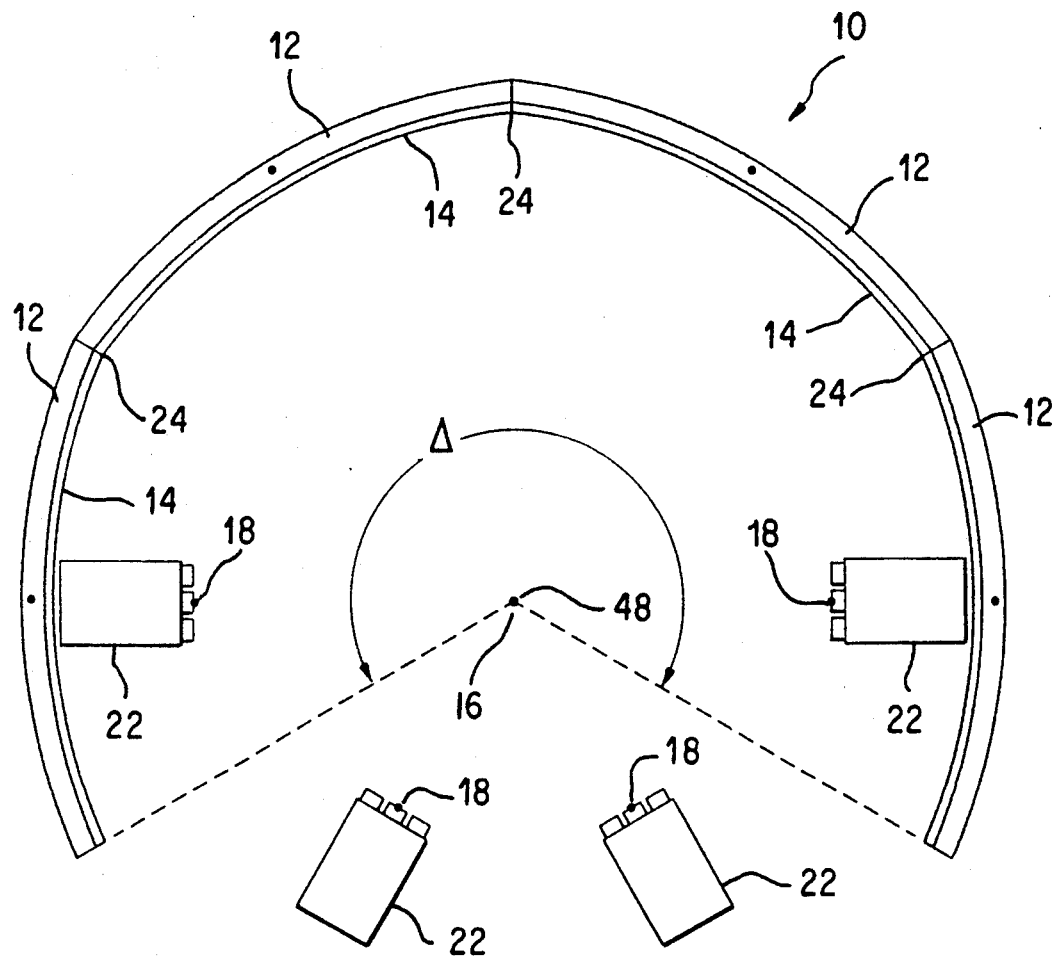
FIG. 5 is a graphical representation showing a plan view of the segmented ellipsoidal projecting system in a typical embodiment.

In the operation of the projection system 10, it can be used to project life-like images for an air traffic control tower simulator. As shown in FIG. 5, four screen segments 12 each having an ellipsoidal surface 14 and a horizontal field of view of 60° are arranged such that their first focal point coincides at point 48. Thus, a horizontal field of view of 240°, is provided for the observers. There are four projectors 22 provided, one for each screen segment 12. Each surface 14 is fabricated of high-gain screen material or otherwise provided with a high-gain finish to provide sufficient light reflection back to the observers. The projectors 22 are CRT projectors and each project an image upon their respective screen segments 12. All light rays making up the image are preferentially reflected back through the point 48 to a greater or lesser extent according to the value of screen gain selected. Thus, light rays emitted from two different projectors 22 and reflecting back from one of the boundaries 24 pass through the same point 48 and therefore essentially overlap with each other. Thus, regardless of where the observer is in front of the screen segments 12, there exists no abrupt change in brightness across the boundaries 24.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A projection system comprising:
    a plurality of screen segments, each defining a surface in the shape of an ellipsoidal segment such that each surface has a first focal point and a second focal point, said screen segments arranged such that an edge of the surface of one of the screen segments is essentially adjacent along its entire length to an edge of the surface of another screen segment; and
    a plurality of projectors equal to the number of screen segments wherein each of said projectors projects an image upon one of the screen segments from the second focal point of that screen segment.

2. A projection screen as described in claim 1 wherein the screen segments are arranged such that the first focal point of each surface essentially coincide with each other.

3. A projection system as described in claim 2 wherein the surface of each screen segment is a high-gain surface.

4. A projection system as described in claim 3 wherein each projector is a CRT projector.

5. A projection system as described in claim 4 wherein each surface provides a horizontal field of view of 60° as measured from the first focal point.

6. A projection system as described in claim 5 wherein each surface provides a vertical field of view of 40° as measured from the first focal point.

7. A projection system as described in claim 6 wherein each surface segment provides an eye relief of 144" as measured from the focal point.

8. A projection system as described in claim 7 wherein there are four screen segments.

9. A projection system as described in claim 7 wherein there are six screen segments.

10. A method for forming a projection system comprising the steps of:
    placing a plurality of ellipsoidal screens adjacent each other such that they each essentially have a same first focal point;
    choosing a viewpoint on an ellipsoidal screen which provides sufficient eye relief for observers; and selecting a second focal point sufficiently far from the viewpoint to a projector at the second focal point to illuminate the entire corresponding screen, and sufficiently high to avoid blocking light of any other projectors that are used to illuminate other corresponding screens.

11. A method as described in claim 10 including after the selecting step, the step of repeating the choosing and selecting step for every other ellipsoidal screen.

* * * * *